April 25, 1939.   W. DIETERLE   2,155,475
SENSITIZING SILVER HALIDE EMULSIONS

Filed Oct. 20, 1936

Unsensitized Silver Chloride Emulsion

SilverChloride Emulsion sensitized with the Dye of Example 1

SilverChloride Emulsion sensitized with the Dye of Example 10

SilverChloride Emulsion sensitized with the Dye of Example 13

Inventor
Walter Dieterle
By His Attorney

Patented Apr. 25, 1939

2,155,475

UNITED STATES PATENT OFFICE 2,155,475

SENSITIZING SILVER HALIDE EMULSIONS

Walter Dieterle, Dessau, Germany, assignor to Agfa Ansco Corporation, Binghamton, N. Y., a corporation of New York Application October 20, 1936, Serial No. 106,575
In Germany July 23, 1936

4 Claims. (Cl. 95—7)

My present invention relates to sensitizing silver halide emulsions.

One of its objects is to provide an emulsion having its sensitivity raised over the range of wave lengths to which a silver halide emulsion is normally sensitive. Another object is to provide a silver halide emulsion sensitized by means of a new class of sensitizers. Further objects will be seen from the detailed specification following hereafter.

I have found that silver halide emulsions, especially silver chloride emulsions, can advantageously be sensitized with a polymethine dyestuff which has been made by condensation of a diamine or a triamine with an aldehyde of a heterocyclic nitrogen compound containing in α-position to the nitrogen atom a reactive methylene group and in which the aldehyde group stands in place of a hydrogen atom of the methylene group.

These dyestuffs may be derived from dyestuffs of the above mentioned class by using instead of the simple amine a diamine (triamine) for the condensation and causing two (three) molecular proportions of aldehyde to react with one molecular proportion of diamine (triamine). The fundamental character of these dyestuffs is essentially the same as that of the known class, only the color is somewhat poorer. Quite unexpectedly it is found that these dyestuffs have a sensitizing action.

have a pronounced injurious action on the sensitization.

Reference is made to the accompanying drawing in which there are represented spectograms of the same emulsion sensitized with my sensitizers.

Figure 1:
Fig. 1 shows for the sake of comparison the spectrogram of the unsensitized silver halide emulsion used for the tests.
Figure 2:
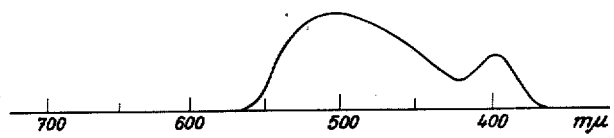
Fig. 2 shows the spectrogram of the silver halide emulsion sensitized according to Example 1.
Figure 3:
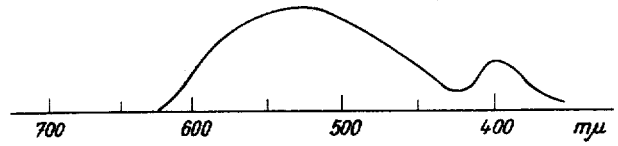
Fig. 3 shows the spectrogram of the silver halide emulsion sensitized according to Example 10.
Figure 4:
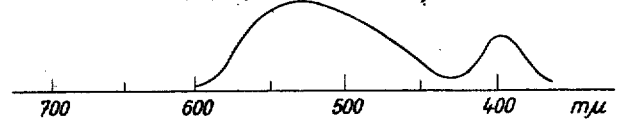
Fig. 4 shows the spectrogram of the silver halide emulsion sensitized according to Example 13.

The art of producing photographic emulsions is thus enriched by a new class of sensitizers constituted by dyestuffs of an extensive group, the numbers of which present a great capacity for variation by the introduction of substituents.

The following examples serve to illustrate the invention:

Example 1

20 parts by volume of 30 per cent hydrochloric acid are diluted to 100 parts with water, 10 parts of benzidine and 21 parts of 1,3,3-trimethyl-2-methylene-indoline-omega-aldehyde are added and the mixture heated for half an hour at about 100° C. The dyestuff which crystallizes out after cooling is filtered off by suction washed with a little water and dried under reduced pressure. The dye has the following formula:

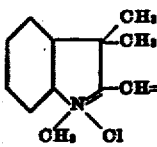 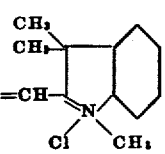

Dyestuffs which are used in this invention have the general formula

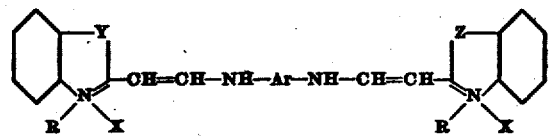

in which Y and Z=S, Se, —CH=CH—,

wherein $R_1$ and $R_2$ are alkyl groups,
R=alkyl,
Ar=an aromatic radical, for instance phenylene, diphenylene, naphthalene,
X=halogen or another acid radical.

In this formula the heterocyclic ring systems and also the aromatic ring system, which contains the amino-group, may carry various substituents, excepting, of course, those which may The yield is about 29 parts. A silver chloride emulsion sensitized with the dye has a maximum of sensitivity at a wave length of about 510 mμ.

Example 2

By condensing 2 molecular proportions of 1,3,3-trimethyl-2-methylene-indoline-omega-aldehyde with 1 molecular proportion of ortho-phenylenediamine the following dye is obtained

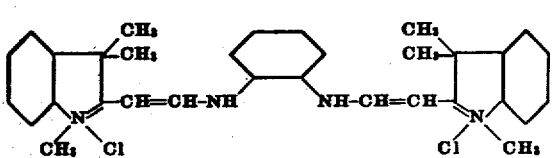

A silver chloride emulsion sensitized with the dye has a maximum of sensitivity at a wave length of about 470 mμ.

Example 3

By condensing 2 molecular proportions of 1,3,3-trimethyl-2-methylene-indoline-omega-aldehyde

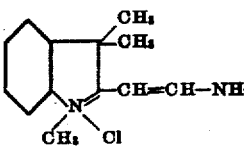

with 1 molecular proportion of meta-phenylenediamine the following dye is obtained

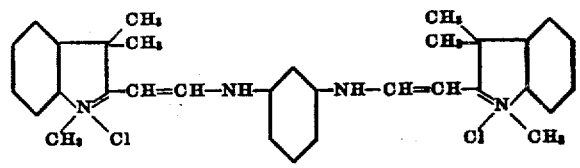

A silver chloride emulsion sensitized with the dye has a maximum of sensitivity at a wave length of about 470 mμ.

Example 4

By condensing 2 molecular proportions of 1,3,3-trimethyl-2-methylene-indoline-omega-aldehyde

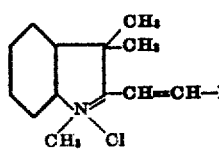

with 1 molecular proportion of 1.5-naphthalenediamine the following dye is obtained

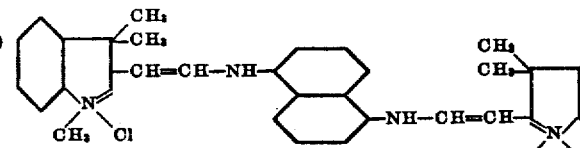

A silver chloride emulsion sensitized with the dye has a maximum of sensitivity at a wave length of about 480 mμ.

Example 5

By condensing 2 molecular proportions of 1,3,3-trimethyl-2-methylene-indoline-omega-aldehyde with 1 molecular proportion of 3,3'-4,4'-tolidine the following dye is obtained

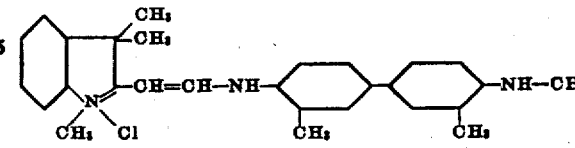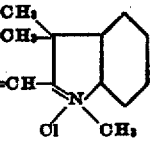

A silver chloride emulsion sensitized with the dye has a maximum of sensitivity at a wave length of about 490 mμ.

Example 6

By condensing 2 molecular proportions of 1,3,3-trimethyl-2-methylene-indoline-omega-aldehyde with 1 molecular proportion of 4,4'-diamino-3,3'-dichlorophenylmethane the following dye is obtained:

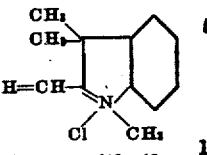

A silver chloride emulsion sensitized with the dye has a maximum of sensitivity at a wave length of about 450 mμ.

Example 7

By condensing 2 molecular proportions of 1,3,3-trimethyl-2-methylene-indoline-omega-aldehyde with 1 molecular proportion of 5,5'-diamino-2,2'-methylene-diphenylsulfone the following dye is obtained

A silver chloride emulsion sensitized with the dye has a maximum of sensitivity at a wave length of about 460 mμ.

Example 8

By condensing 2 molecular proportions of 1,3,3-trimethyl-2-methylene-indoline-omega-aldehyde with 1 molecular proportion of 4,4'-diamino-benzophenone the following dye is obtained

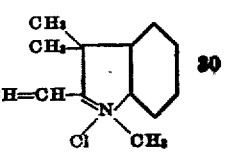

A silver chloride emulsion sensitized with the dye has a maximum of sensitivity at a wave length of about 480 mμ.

Example 9

15 parts by volume of hydrochloric acid of 30 per cent strength are diluted with 100 parts by volume of water; to this mixture there are added 5.5 parts by weight of 4,4'-diaminostilbene and 12 parts by weight of 1,3,3-trimethyl-2-methyleneindoline-omega-aldehyde, and the mixture is heated for ½ hour on the water bath. The dye which crystallizes after cooling is recrystallized from water in order to separate it from a small quantity of insoluble. The yield is 15 parts by weight. The dye corresponds with the following formula:

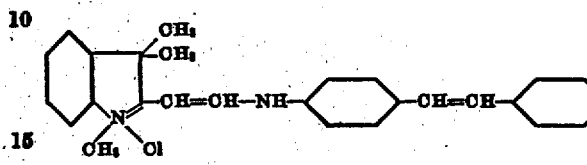

A silver chloride emulsion sensitized with the dye has a maximum of sensitivity at a wave length of about 520 mμ.

*Example 10*

By condensing 2 molecular proportions of 1,3,3-trimethyl-2-methylene-indoline-omega- aldehyde with 1 molecular proportion of 4,4'-diamino-diphenylamine the following dye is obtained

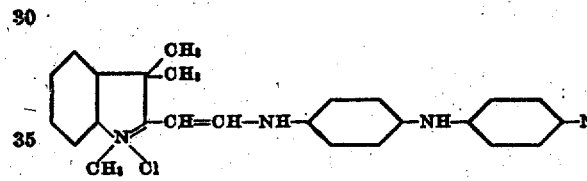

A silver chloride emulsion sensitized with the dye has a maximum of sensitivity at a wave length of 530 mμ.

*Example 11*

By condensing 2 molecular proportions of 1,3,3-trimethyl-5-methoxy-2-methylene-indoline-omega-aldehyde with 1 molecular proportion of 4,4'-diamino-3,3'-dimethoxydiphenylmethane the following dye is obtained:

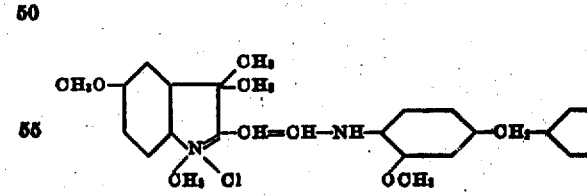

A silver chloride emulsion sensitized with the dye has a maximum of sensitivity at a wave length of about 480 mμ.

*Example 12*

By condensing 2 molecular proportions of 1-ethyl-2-methylene - quinoline - omega - aldehyde with 1 molecular proportion of para-phenylenediamine the following dye is obtained:

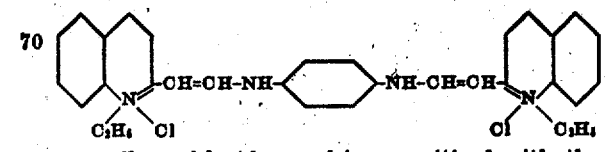

A silver chloride emulsion sensitized with the dye has a maximum of sensitivity at a wave length of about 550 mμ.

*Example 13*

By condensing 2 molecular proportions of 1-methyl-2-methylene-benzthiazole - omega - aldehyde with 1 molecular proportion of para-

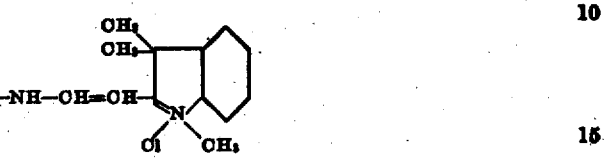

phenylene-diamine the following dye is obtained:

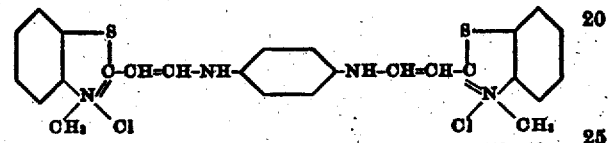

A silver chloride emulsion sensitized with the dye has a maximum of sensitivity at a wave length of about 530 mμ.

What I claim is:
1. A silver halide emulsion comprising a dye corresponding with the formula:

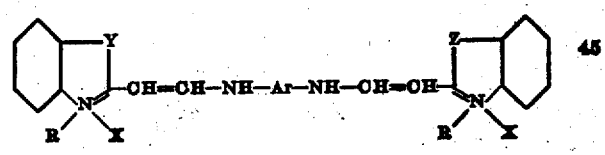

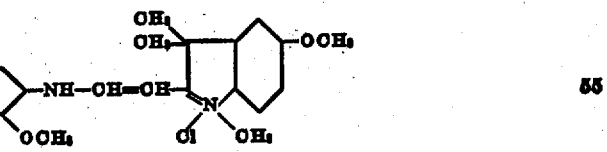

in which Y and Z stand for a member selected from the group consisting of S, Se, —CH=CH—, and

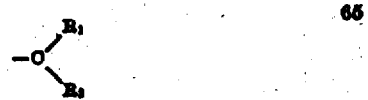

wherein $R_1$ and $R_2$ stand for alkyl groups, R stands for alkyl, Ar stands for an aromatic radical which contains at least one benzene nucleus but no more than two benzene nuclei, X stands for an anion capable of precipitating the dye.

2. A silver halide emulsion containing the dye:

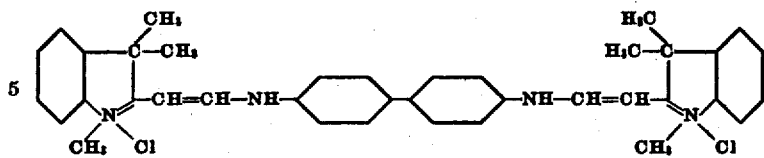

3. A silver halide emulsion containing the dye:

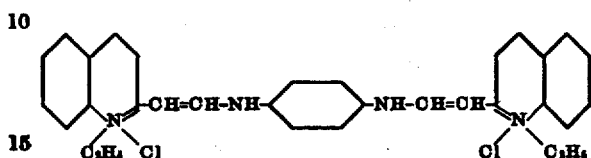

4. A silver halide emulsion containing the dye:

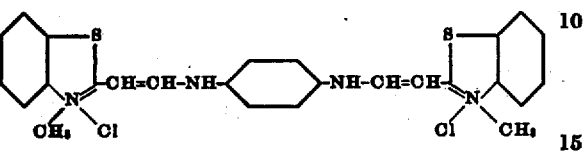

WALTER DIETERLE.

DISCLAIMER 2,155,475.—*Walter Dieterle*, Dessau, Germany. SENSITIZING SILVER HALIDE EMULSIONS. Patent dated April 25, 1939. Disclaimer filed March 14, 1941, by the assignee, *General Aniline & Film Corporation*.

Hereby enters this disclaimer to claim 1 of the above patent.

[*Official Gazette April 8, 1941.*]

2. A silver halide emulsion containing the dye:

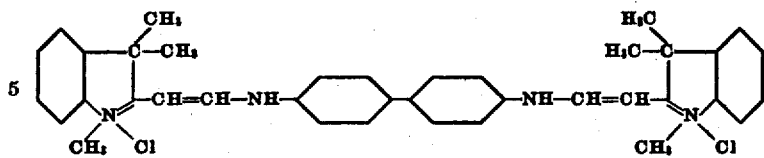

3. A silver halide emulsion containing the dye:   4. A silver halide emulsion containing the dye:

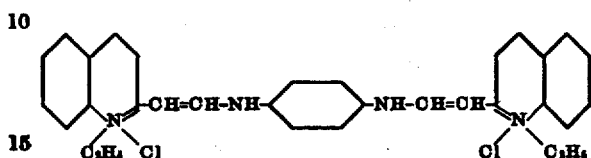 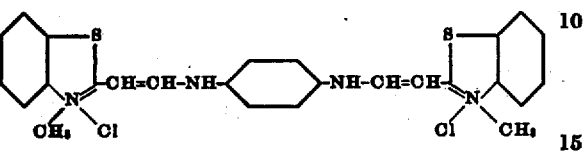

WALTER DIETERLE.

DISCLAIMER 2,155,475.—*Walter Dieterle*, Dessau, Germany. Sensitizing Silver Halide Emulsions. Patent dated April 25, 1939. Disclaimer filed March 14, 1941, by the assignee, *General Aniline & Film Corporation*.

Hereby enters this disclaimer to claim 1 of the above patent.

[*Official Gazette April 8, 1941.*]